United States Patent
Resch et al.

(10) Patent No.: US 10,958,430 B1
(45) Date of Patent: *Mar. 23, 2021

(54) LOG RECORD GENERATION AND STORAGE BASED ON ASSOCIATED PRINCIPALS

(71) Applicant: Pure Storage, Inc., Mountain View, CA (US)

(72) Inventors: Jason K. Resch, Chicago, IL (US); Wesley B. Leggette, Chicago, IL (US)

(73) Assignee: PURE STORAGE, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/554,273

(22) Filed: Aug. 28, 2019

Related U.S. Application Data (60) Continuation of application No. 15/952,707, filed on Apr. 13, 2018, now Pat. No. 10,454,678, which is a
(Continued)

(51) Int. Cl.
*H04L 9/32* (2006.01)
*H04L 9/08* (2006.01)
(Continued)

(52) U.S. Cl.
CPC ............. *H04L 9/0894* (2013.01); *G06F 3/06* (2013.01); *G06F 3/0604* (2013.01); *G06F 3/067* (2013.01);
(Continued)

(58) Field of Classification Search
None
See application file for complete search history.

(56) References Cited

U.S. PATENT DOCUMENTS 4,092,732 A 5/1978 Ouchi
5,263,085 A 11/1993 Shamir
(Continued)

OTHER PUBLICATIONS

Chung; An Automatic Data Segmentation Method for 3D Measured Data Points; National Taiwan University; pp. 1-8; 1998.
(Continued)

*Primary Examiner* — Brandon S Hoffman
(74) *Attorney, Agent, or Firm* — Garlick & Markison; Shayne X. Short (57) ABSTRACT

A computing device includes an interface configured to interface and communicate with a dispersed storage network (DSN), a memory that stores operational instructions, and processing circuitry operably coupled to the interface and to the memory. The processing circuitry is configured to execute the operational instructions to perform various operations and functions. The computing device receives (e.g., via the DSN and from a first other computing device) a storage request that is based on data object. The computing device extracts a remote address (associated with the first other computing device) from the storage request. The computing device processes the storage request to determine whether any principals are associated with the storage request, wherein the principals include DSN system entities. The computing device performs selective operations based on a determination that the principals are associated with the storage request or another determination that the principals are not associated with the storage request.

20 Claims, 7 Drawing Sheets

Related U.S. Application Data continuation of application No. 14/954,527, filed on Nov. 30, 2015, now Pat. No. 9,992,019, which is a division of application No. 13/587,277, filed on Aug. 16, 2012, now Pat. No. 9,229,823.

(60) Provisional application No. 61/524,521, filed on Aug. 17, 2011.

(51) Int. Cl.

| | | |
|---|---|---|
| *G06F 11/00* | (2006.01) | |
| *G06F 3/06* | (2006.01) | |
| *G06F 15/173* | (2006.01) | |
| *G06F 11/16* | (2006.01) | |
| *G06F 11/14* | (2006.01) | |
| *H04L 29/06* | (2006.01) | |
| *H04L 9/00* | (2006.01) | |
| *G06F 21/00* | (2013.01) | |

(52) U.S. Cl.
CPC .......... *G06F 11/00* (2013.01); *G06F 11/1612* (2013.01); *G06F 15/17331* (2013.01); *H04L 9/0863* (2013.01); *H04L 9/0869* (2013.01); *H04L 9/0877* (2013.01); *H04L 9/32* (2013.01); *H04L 9/321* (2013.01); *H04L 9/3263* (2013.01); *G06F 11/1446* (2013.01); *G06F 21/00* (2013.01); *G06F 2211/1028* (2013.01); *H04L 9/00* (2013.01); *H04L 9/085* (2013.01); *H04L 29/06* (2013.01); *H04L 2209/16* (2013.01)

(56) References Cited

U.S. PATENT DOCUMENTS

| | | | |
|---|---|---|---|
| 5,454,101 | A | 9/1995 | MacKay |
| 5,485,474 | A | 1/1996 | Rabin |
| 5,774,643 | A | 6/1998 | Lubbers |
| 5,802,364 | A | 9/1998 | Senator |
| 5,809,285 | A | 9/1998 | Hilland |
| 5,890,156 | A | 3/1999 | Rekieta |
| 5,987,622 | A | 11/1999 | Lo Verso |
| 5,991,414 | A | 11/1999 | Garay |
| 6,012,159 | A | 1/2000 | Fischer |
| 6,058,454 | A | 5/2000 | Gerlach |
| 6,088,454 | A | 7/2000 | Nagashima |
| 6,128,277 | A | 10/2000 | Bruck |
| 6,175,571 | B1 | 1/2001 | Haddock |
| 6,192,472 | B1 | 2/2001 | Garay |
| 6,256,688 | B1 | 7/2001 | Suetaka |
| 6,272,658 | B1 | 8/2001 | Steele |
| 6,301,604 | B1 | 10/2001 | Nojima |
| 6,356,949 | B1 | 3/2002 | Katsandres |
| 6,366,995 | B1 | 4/2002 | Vilkov |
| 6,374,336 | B1 | 4/2002 | Peters |
| 6,415,373 | B1 | 7/2002 | Peters |
| 6,418,539 | B1 | 7/2002 | Walker |
| 6,449,688 | B1 | 9/2002 | Peters |
| 6,550,009 | B1 | 4/2003 | Uranaka |
| 6,567,948 | B2 | 5/2003 | Steele |
| 6,571,282 | B1 | 5/2003 | Bowman-Amuah |
| 6,609,223 | B1 | 8/2003 | Wolfgang |
| 6,718,361 | B1 | 4/2004 | Basani |
| 6,760,808 | B2 | 7/2004 | Peters |
| 6,785,768 | B2 | 8/2004 | Peters |
| 6,785,783 | B2 | 8/2004 | Buckland |
| 6,826,711 | B2 | 11/2004 | Moulton |
| 6,879,596 | B1 | 4/2005 | Dooply |
| 7,003,688 | B1 | 2/2006 | Pittelkow |
| 7,024,451 | B2 | 4/2006 | Jorgenson |
| 7,024,609 | B2 | 4/2006 | Wolfgang |
| 7,080,101 | B1 | 7/2006 | Watson |
| 7,103,824 | B2 | 9/2006 | Halford |
| 7,103,915 | B2 | 9/2006 | Redlich |
| 7,111,115 | B2 | 9/2006 | Peters |
| 7,140,044 | B2 | 11/2006 | Redlich |
| 7,146,644 | B2 | 12/2006 | Redlich |
| 7,171,493 | B2 | 1/2007 | Shu |
| 7,222,133 | B1 | 5/2007 | Raipurkar |
| 7,240,236 | B2 | 7/2007 | Cutts |
| 7,272,613 | B2 | 9/2007 | Sim |
| 7,636,724 | B2 | 12/2009 | De La Torre |
| 8,132,073 | B1 * | 3/2012 | Bowers ................ H04L 9/3271 714/755 |
| 2002/0062422 | A1 | 5/2002 | Butterworth |
| 2002/0166079 | A1 | 11/2002 | Ulrich |
| 2003/0018927 | A1 | 1/2003 | Gadir |
| 2003/0037261 | A1 | 2/2003 | Meffert |
| 2003/0065617 | A1 | 4/2003 | Watkins |
| 2003/0084020 | A1 | 5/2003 | Shu |
| 2004/0024963 | A1 | 2/2004 | Talagala |
| 2004/0122917 | A1 | 6/2004 | Menon |
| 2004/0215998 | A1 | 10/2004 | Buxton |
| 2004/0228493 | A1 | 11/2004 | Ma |
| 2005/0100022 | A1 | 5/2005 | Ramprashad |
| 2005/0114594 | A1 | 5/2005 | Corbett |
| 2005/0125593 | A1 | 6/2005 | Karpoff |
| 2005/0131993 | A1 | 6/2005 | Fatula, Jr. |
| 2005/0132070 | A1 | 6/2005 | Redlich |
| 2005/0144382 | A1 | 6/2005 | Schmisseur |
| 2005/0229069 | A1 | 10/2005 | Hassner |
| 2006/0047907 | A1 | 3/2006 | Shiga |
| 2006/0136448 | A1 | 6/2006 | Cialini |
| 2006/0156059 | A1 | 7/2006 | Kitamura |
| 2006/0224603 | A1 | 10/2006 | Correll, Jr. |
| 2007/0079081 | A1 | 4/2007 | Gladwin |
| 2007/0079082 | A1 | 4/2007 | Gladwin |
| 2007/0079083 | A1 | 4/2007 | Gladwin |
| 2007/0088970 | A1 | 4/2007 | Buxton |
| 2007/0174192 | A1 | 7/2007 | Gladwin |
| 2007/0214285 | A1 | 9/2007 | Au |
| 2007/0234110 | A1 | 10/2007 | Soran |
| 2007/0283167 | A1 | 12/2007 | Venters, III |
| 2009/0037728 | A1 * | 2/2009 | Kamikura ............. H04L 9/3263 713/156 |
| 2009/0094251 | A1 | 4/2009 | Gladwin |
| 2009/0094318 | A1 | 4/2009 | Gladwin |
| 2010/0023524 | A1 | 1/2010 | Gladwin |
| 2010/0180116 | A1 | 7/2010 | Coan |
| 2010/0235638 | A1 | 9/2010 | Irvine |
| 2013/0036456 | A1 * | 2/2013 | Boysen ................ H04L 9/3215 726/4 |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

(56) References Cited

OTHER PUBLICATIONS

Shamir; How to Share a Secret; Communications of the ACM; vol. 22, No. 11; Nov. 1979; pp. 612-613.
Smith; Lightweight Directory Access Protocol (LDAP): Uniform Resource Locator; IETF Network Working Group; RFC 4516; Jun. 2006; pp. 1-15.
Smith; Lightweight Directory Access Protocol (LDAP): String Representation of Search Filters; IETF Network Working Group; RFC 4515; Jun. 2006; pp. 1-12.
Wildi; Java iSCSi Initiator; Master Thesis; Department of Computer and Information Science, University of Konstanz; Feb. 2007; 60 pgs.
Xin, et al.; Evaluation of Distributed Recovery in Large-Scale Storage Systems; 13th IEEE International Symposium on High Performance Distributed Computing; Jun. 2004; pp. 172-181.
Zeilenga; Lightweight Directory Access Protocol (LDAP): Directory Information Models; IETF Network Working Group; RFC 4512; Jun. 2006; pp. 1-49.
Zeilenga; Lightweight Directory Access Protocol (LDAP): Internationalized String Preparation; IETF Network Working Group; RFC 4518; Jun. 2006; pp. 1-14.
Zeilenga; Lightweight Directory Access Protocol (LDAP): String Representation of Distinguished Names; IETF Network Working Group; RFC 4514; Jun. 2006; pp. 1-15.
Zeilenga; Lightweight Directory Access Protocol (LDAP): Technical Specification Road Map; IETF Network Working Group; RFC 4510; Jun. 2006; pp. 1-8.

\* cited by examiner

LOG RECORD GENERATION AND STORAGE BASED ON ASSOCIATED PRINCIPALS

CROSS REFERENCE TO RELATED PATENTS

The present U.S. Utility Patent Application claims priority pursuant to 35 U.S.C. § 120 as a continuation of U.S. Utility patent application Ser. No. 15/952,707, entitled "ACCESSOR-BASED AUDIT TRAILS," filed Apr. 13, 2018, now issued as U.S. Pat. No. 10,454,678 on Oct. 22, 2019, which is a continuation-in-part (CIP) of U.S. Utility patent application Ser. No. 14/954,527, entitled "STORAGE AND RETRIEVAL OF DISPERSED STORAGE NETWORK ACCESS INFORMATION," filed Nov. 30, 2015, now issued as U.S. Pat. No. 9,992,019 on Jun. 5, 2018, which claims priority pursuant to 35 U.S.C. § 121 as a divisional of U.S. Utility patent application Ser. No. 13/587,277, entitled "STORAGE AND RETRIEVAL OF DISPERSED STORAGE NETWORK ACCESS INFORMATION," filed Aug. 6, 2012, now issued as U.S. Pat. No. 9,229,823 on Jan. 5, 2016, which claims priority pursuant to 35 U.S.C. § 119(e) to U.S. Provisional Application No. 61/524,521, entitled "DISTRIBUTED AUTHENTICATION TOKEN DEVICE," filed Aug. 17, 2011, all of which are hereby incorporated herein by reference in their entirety and made part of the present U.S. patent application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Prior art data storage systems store data yet do not provide any information regarding the data itself and particularly how if may exist with respect to various specific devices within such data storage systems. There continues to be significant room for improvement in the manner and operation of such prior art data storage systems.

DETAILED DESCRIPTION OF THE INVENTION

Figure 1:
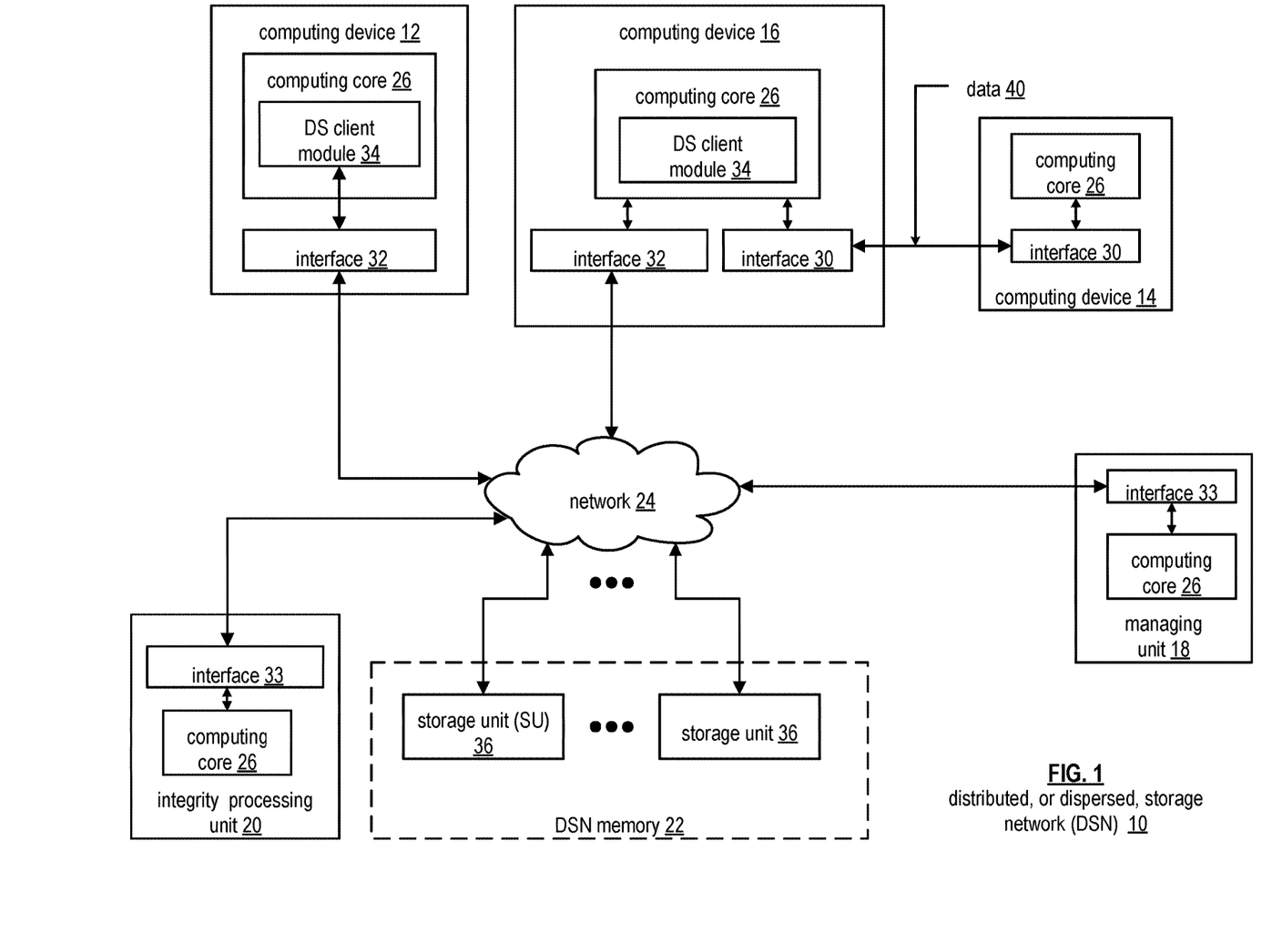
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
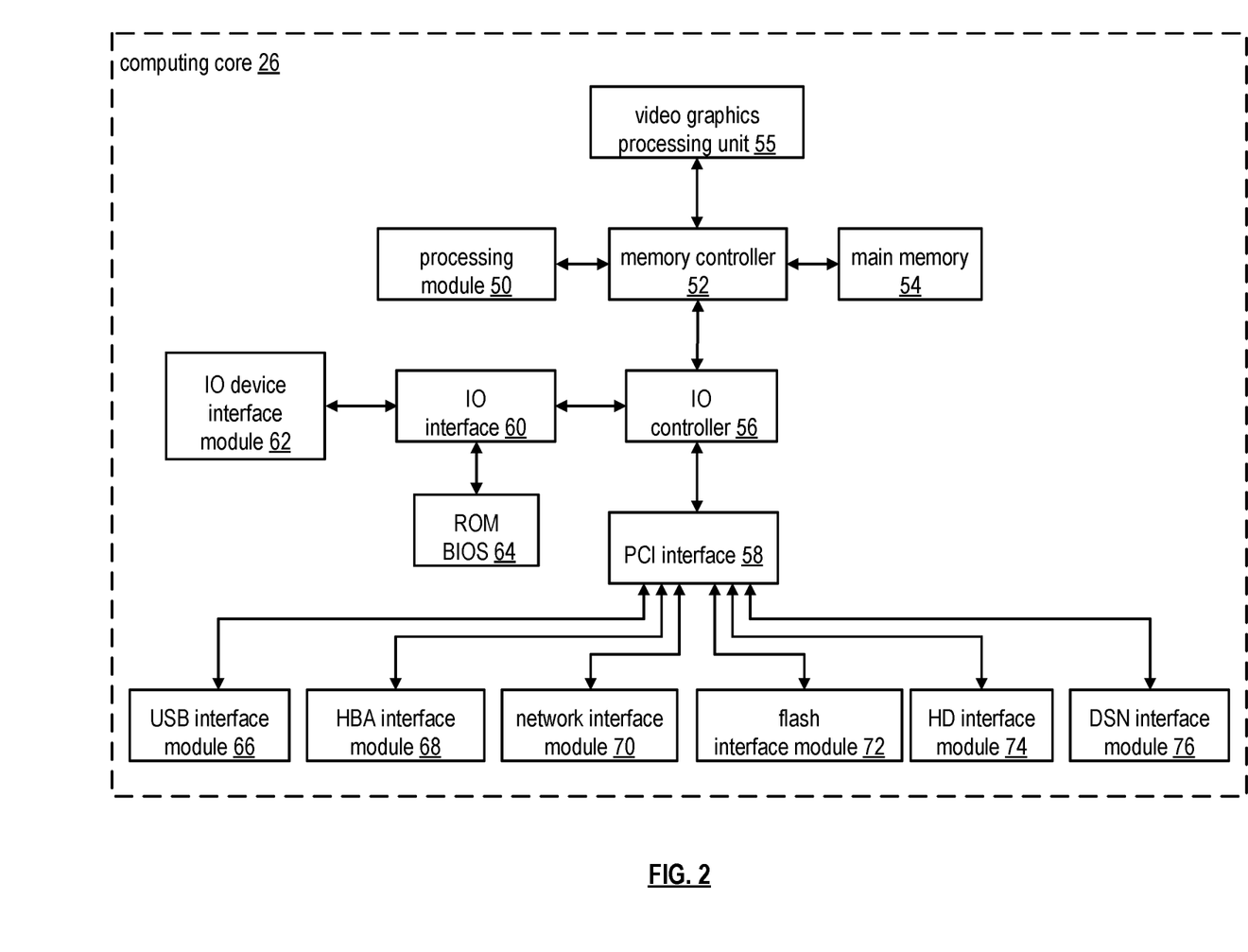
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN module 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

Figures 3, 4:
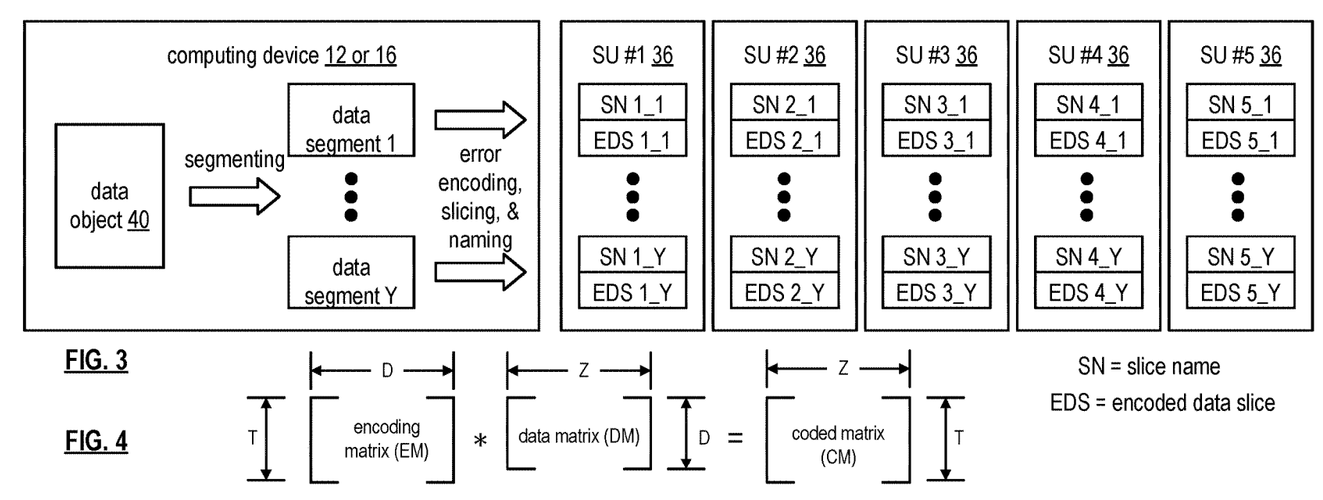
FIG. 3 is a schematic block diagram of an example of dispersed storage error encoding of data in accordance with the present invention.
FIG. 4 is a schematic block diagram of a generic example of an error encoding function in accordance with the present invention.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

Figure 5:
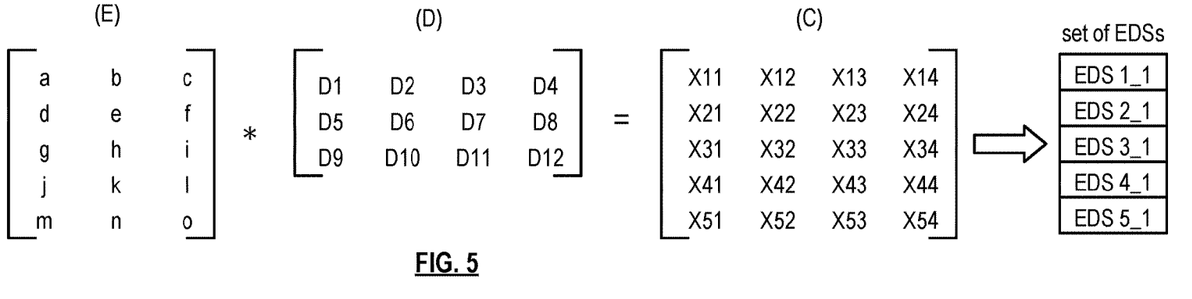
FIG. 5 is a schematic block diagram of a specific example of an error encoding function in accordance with the present invention.

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Figure 6:
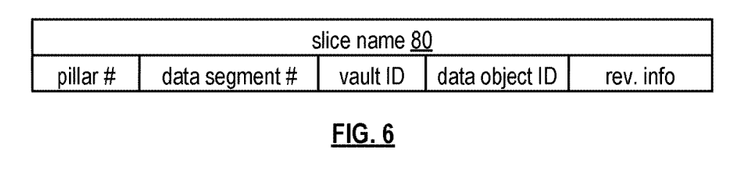
FIG. 6 is a schematic block diagram of an example of a slice name of an encoded data slice (EDS) in accordance with the present invention.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
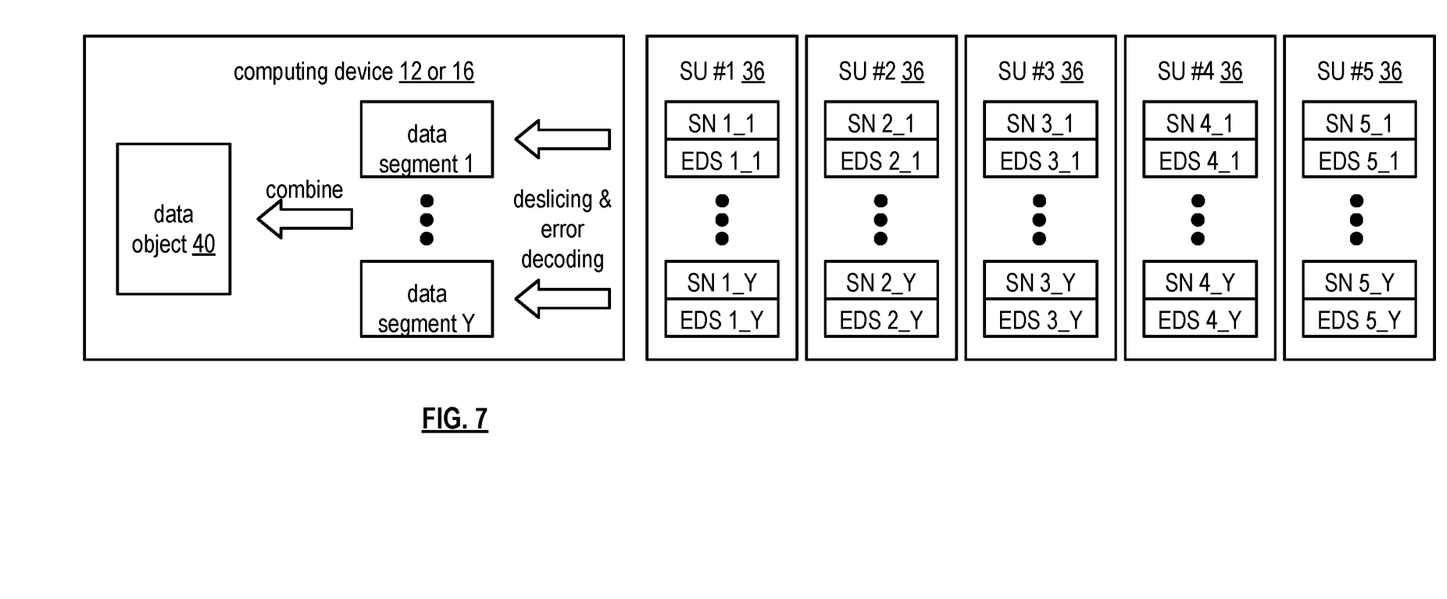
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
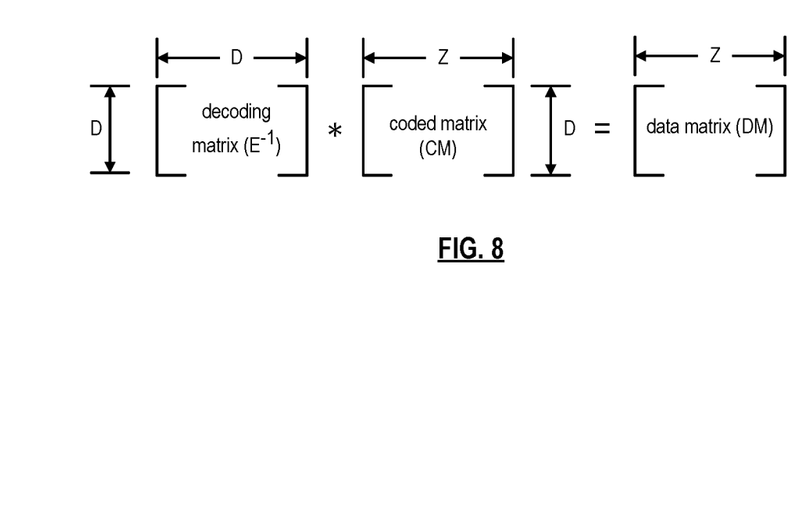
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

In some examples, note that dispersed or distributed storage network (DSN) memory includes one or more of a plurality of storage units (SUs) such as SUs 36 (e.g., that may alternatively be referred to a distributed storage and/or task network (DSTN) module that includes a plurality of distributed storage and/or task (DST) execution units 36 that may be located at geographically different sites (e.g., one in Chicago, one in Milwaukee, etc.). Each of the SUs (e.g., alternatively referred to as DST execution units in some examples) is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

In addition, a computing device (e.g., alternatively referred to as DST processing unit in some examples) is operable to perform various functions, operations, etc. including to generate dispersed error encoded data. In some examples, a computing device is configured to process a data object to generate a plurality of data segments (, such that the data object is segmented into a plurality of data segments). Then, the computing device is configured to dispersed error encode the plurality of data segments in accordance with dispersed error encoding parameters to produce sets of encoded data slices (EDSs). In some examples, the computing device is configured to dispersed error encode a data segment of the plurality of data segments in accordance with the dispersed error encoding parameters to produce a set of EDSs. In certain examples, the set of EDSs is distributedly stored in a set of storage units (SUs) within the DSN.

Figure 9A:
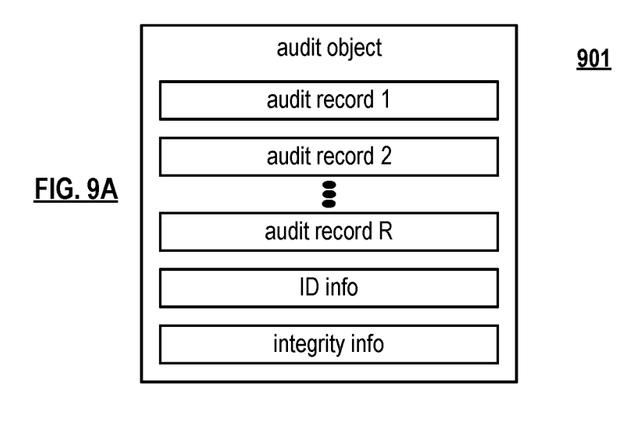
FIG. 9A is a diagram illustrating an example of an audit object in accordance with the present invention.

FIG. 9A is a diagram illustrating an example 901 of an audit object in accordance with the present invention. The audit object includes a plurality of audit records 1-R, identifier (ID) information, and integrity information. Each audit record of the audit records 1-R includes information related to transactions within a dispersed storage network (DSN). Audit record content is discussed in greater detail with reference to FIG. 10B. The ID information includes an originator ID associated with the audit object (e.g., an ID of an entity that created the audit object). The integrity information includes one or more of a device ID, a certificate chain, and a signature.

Figure 9B:
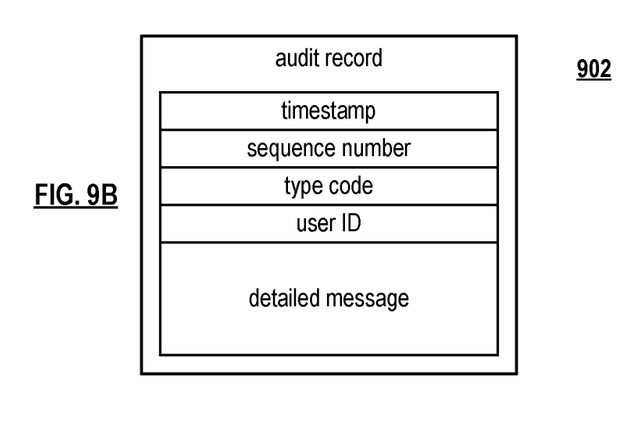
FIG. 9B is a diagram illustrating an example of an audit record in accordance with the present invention.

FIG. 9B is a diagram illustrating an example 902 of an audit record in accordance with the present invention. The audit record includes a timestamp, a sequence number, a type code, a user identifier (ID), and a detailed message. The timestamp includes a creation timestamp associated with a date and/or a time when the audit record was created. The sequence number includes a unique monotonically increasing number associated with a transaction within a dispersed storage network (DSN). The type code includes a record type indicator (e.g., a data access audit event or an authentication audit event). The user ID includes an identifier of one or more principals (e.g., DSN system entities) associated with the audit record causing creation of the audit record. The detailed message may include more information associated with the record including an operation type (e.g., such as one of write, read, delete, login), a remote address (e.g., an Internet protocol address), a data object identifier, and a target vault ID.

Figure 10:
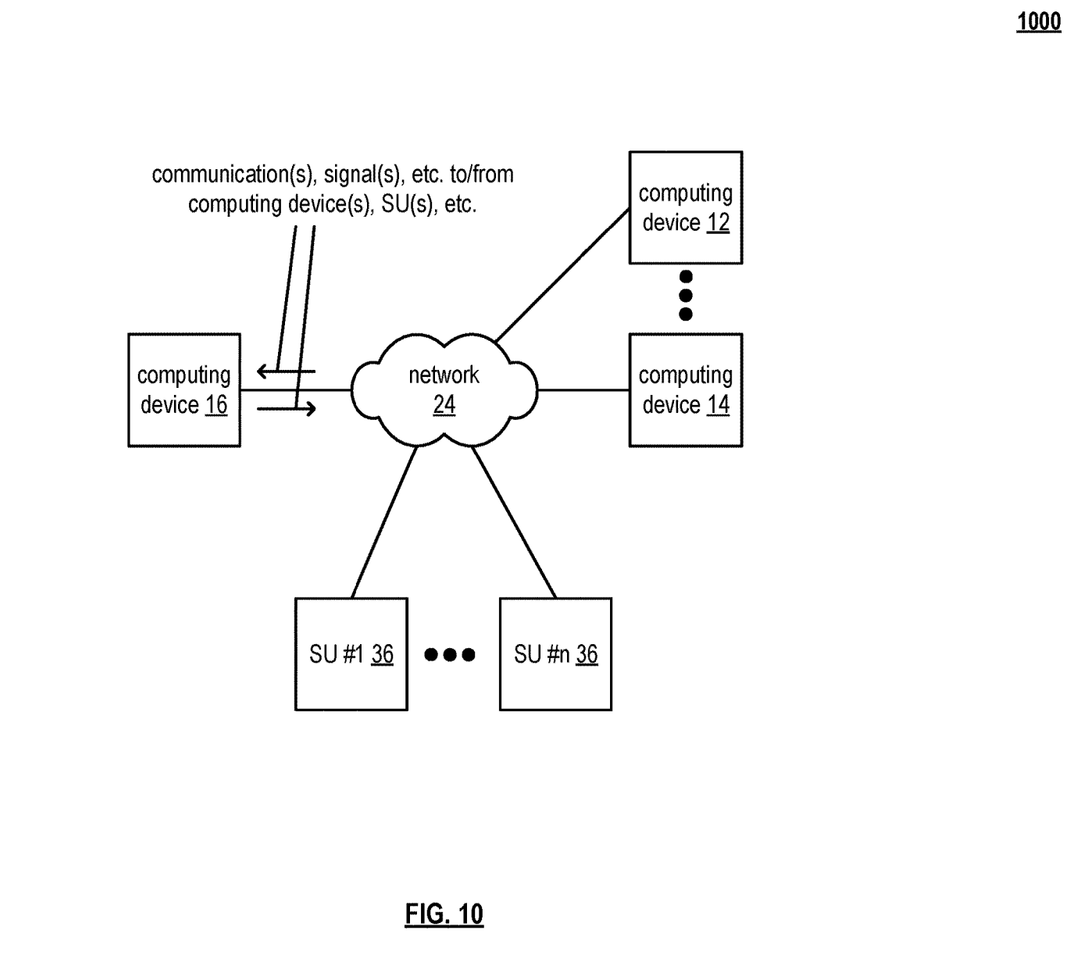
FIG. 10 is a schematic block diagram of another embodiment of a dispersed or distributed storage network (DSN) in accordance with the present invention.

FIG. 10 is a schematic block diagram 1000 of another embodiment of a dispersed or distributed storage network (DSN) in accordance with the present invention. One or more computing devices (e.g., computing device 16, computing device 12, computing device 14) are configured to communication and interact with one or more storage units (SUs) (e.g., #1 36 through SU #n 36) via the DSN (e.g., such as shown by network 24 such as with reference to FIG. 1).

In an example of operation and implementation, a computing device (e.g., computing device 16, computing device 12, computing device 14, etc. and/or other DSN system entity such as an integrity) includes an interface configured to interface and communicate with a dispersed or distributed storage network (DSN), a memory that stores operational instructions, and a processing module, processor, and/or processing circuitry operably coupled to the interface and memory. The processing module, processor, and/or processing circuitry is configured to execute the operational instructions to perform various operations, functions, etc. In some examples, the processing module, processor, and/or processing circuitry, when operable within the computing device based on the operational instructions, is configured to perform various operations, functions, etc. In certain examples, the processing module, processor, and/or processing circuitry, when operable within the computing device is configured to perform one or more functions that may include generation of one or more signals, processing of one or more signals, receiving of one or more signals, transmission of one or more signals, interpreting of one or more signals, etc. and/or any other operations as described herein and/or their equivalents.

In an example of operation and implementation, a storage unit (SU) (e.g., any of the SU #1 36 through SU #n 36) includes an interface configured to interface and communicate with a dispersed or distributed storage network (DSN), a memory that stores operational instructions, and a processing module, processor, and/or processing circuitry operably coupled to the interface and memory. The processing module, processor, and/or processing circuitry is configured to execute the operational instructions to perform various operations, functions, etc. In some examples, the processing module, processor, and/or processing circuitry, when operable within the SU based on the operational instructions, is configured to perform various operations, functions, etc. in certain examples, the processing module, processor, and/or processing circuitry, when operable within the SU is configured to perform one or more functions that may include generation of one or more signals, processing of one or more signals, receiving of one or more signals, transmission of one or more signals, interpreting of one or more signals, etc. and/or any other operations as described herein and/or their equivalents.

In an example of operation and implementation, a computing device 16 is configured to receive (e.g., via the DSN and from a first other computing device 12) a storage request that is based on data object. Note that the data object is segmented into a plurality of data segments, and a data segment of the plurality of data segments is dispersed error encoded in accordance with dispersed error encoding parameters to produce a set of encoded data slices (EDSs) that is distributedly stored among a plurality of storage units (SUs) within the DSN (e.g., SU #1 36 through SU #n 36). The computing device 16 is also configured to extract a remote address from the storage request. Note that the remote address is associated with the first other computing device 12.

The computing device 16 is also configured to process the storage request to determine whether any principals are associated with the storage request. Note that the principals include DSN system entities. Then, based on a determination that the principals are associated with the storage request, the computing device 16 is also configured to extract an operation type, an object identifier (ID), and a vault ID from the storage request. The computing device 16 is also configured to generate an authorization status that indicates an authorized status based on a favorable comparison of authorization levels of the principals and a required authorization level of the storage request. For example, the computing device 16 is also configured to perform a comparison of the authorization levels of the principals and the required authorization level of the storage request. When the comparison is favorable, then the computing device 16 is configured to generate the authorization status.

The computing device 16 is also configured to generate a log record that includes at least one of the remote address, the principals, the object ID, the vault ID, the authorization status, a device ID, and/or a timestamp. The computing device 16 is also configured to facilitate (e.g., via the DSN) storage of the log record within at least one of the first other computing device 112 and/or a second other computing device 14 (and/or any one or more of the plurality of SUs within the DSN (e.g., SU #1 36 through SU #n 36)).

Also, in some examples, note that the storage request includes at least one of a write request, a read request, a delete request, and/or a login request.

In addition, in some alternative examples, the computing device 16 is further configured to process the storage request in accordance with interpreting a media access controller (MAC) address or an Internet Protocol (IP) address of the storage request to extract the remote address from the storage request.

In yet alternative examples, the computing device 16 is further configured to process the storage request to determine whether any principals are associated with the storage request in accordance with extracting one or more principal identifiers (IDs) from the storage request.

Also, based on another determination that the principals are not associated with the storage request, in some examples, the computing device 16 is further configured to facilitate authentication of another principal in accordance with at least one of verifying a user name of the storage request and/or a password of the storage request and in accordance with initiating a Transport Layer Security (TLS) handshake with the other principal and add the other principal to a session record of the storage request.

Note also that the computing device 16 is further configured to receive (e.g., via the DSN and from at least one other computing device such as computing device 12 and/or computing device 14) an access control list (ACL). The computing device 16 is further configured to extract the authorization levels of the principals from the ACL.

In even other examples, the computing device 16 is further configured to facilitate (e.g., via the DSN) the storage of the log record within the at least one of the first other computing device 12 and/or the second other computing device 14 in accordance with at least one of generating an audit record, generating an audit object, storing the audit record, and/or sending the audit record to the at least one of the first other computing device 12 and/or the second other computing device 14 to store the audit record in a DSN memory (e.g., possibly within one any one or more of the plurality of SUs within the DSN (e.g., SU #1 36 through SU #n 36)).

In some examples, with respect to a data object, the data object is segmented into a plurality of data segments, and a data segment of the plurality of data segments is dispersed error encoded in accordance with dispersed error encoding parameters to produce a set of encoded data slices (EDSs) (e.g., in some instances, the set of EDSs are distributedly stored in a plurality of storage units (SUs) within the DSN). In some examples, the set of EDSs is of pillar width. Also, with respect to certain implementations, note that the decode threshold number of EDSs are needed to recover the data segment, and a read threshold number of EDSs provides for reconstruction of the data segment. Also, a write threshold number of EDSs provides for a successful transfer of the set of EDSs from a first at least one location in the DSN to a second at least one location in the DSN. The set of EDSs is of pillar width and includes a pillar number of EDSs. Also, in some examples, each of the decode threshold, the read threshold, and the write threshold is less than the pillar number. Also, in some particular examples, the write threshold number is greater than or equal to the read threshold number that is greater than or equal to the decode threshold number.

Note that the computing device as described herein may be located at a first premises that is remotely located from a second premises associated with at least one other SU, DS unit, computing device, at least one SU of a plurality of SUs within the DSN (e.g., such as a plurality of SUs that are implemented to store distributedly the set of EDSs), etc. In addition, note that such a computing device as described herein may be implemented as any of a number of different devices including a managing unit that is remotely located from another SU, DS unit, computing device, etc. within the DSN and/or other device within the DSN, an integrity processing unit that is remotely located from another computing device and/or other device within the DSN, a scheduling unit that is remotely located from another computing device and/or SU within the DSN, and/or other device. Also, note that such a computing device as described herein may be of any of a variety of types of devices as described herein and/or their equivalents including a DS unit and/or SU included within any group and/or set of DS units and/or SUs within the DSN, a wireless smart phone, a laptop, a tablet, a personal computers (PC), a work station, and/or a video game device. Also, note also that the DSN may be implemented to include or be based on any of a number of different types of communication systems including a wireless communication system, a wire lined communication system, a non-public intranet system, a public internet system, a local area network (LAN), and/or a wide area network (WAN).

Figure 11:
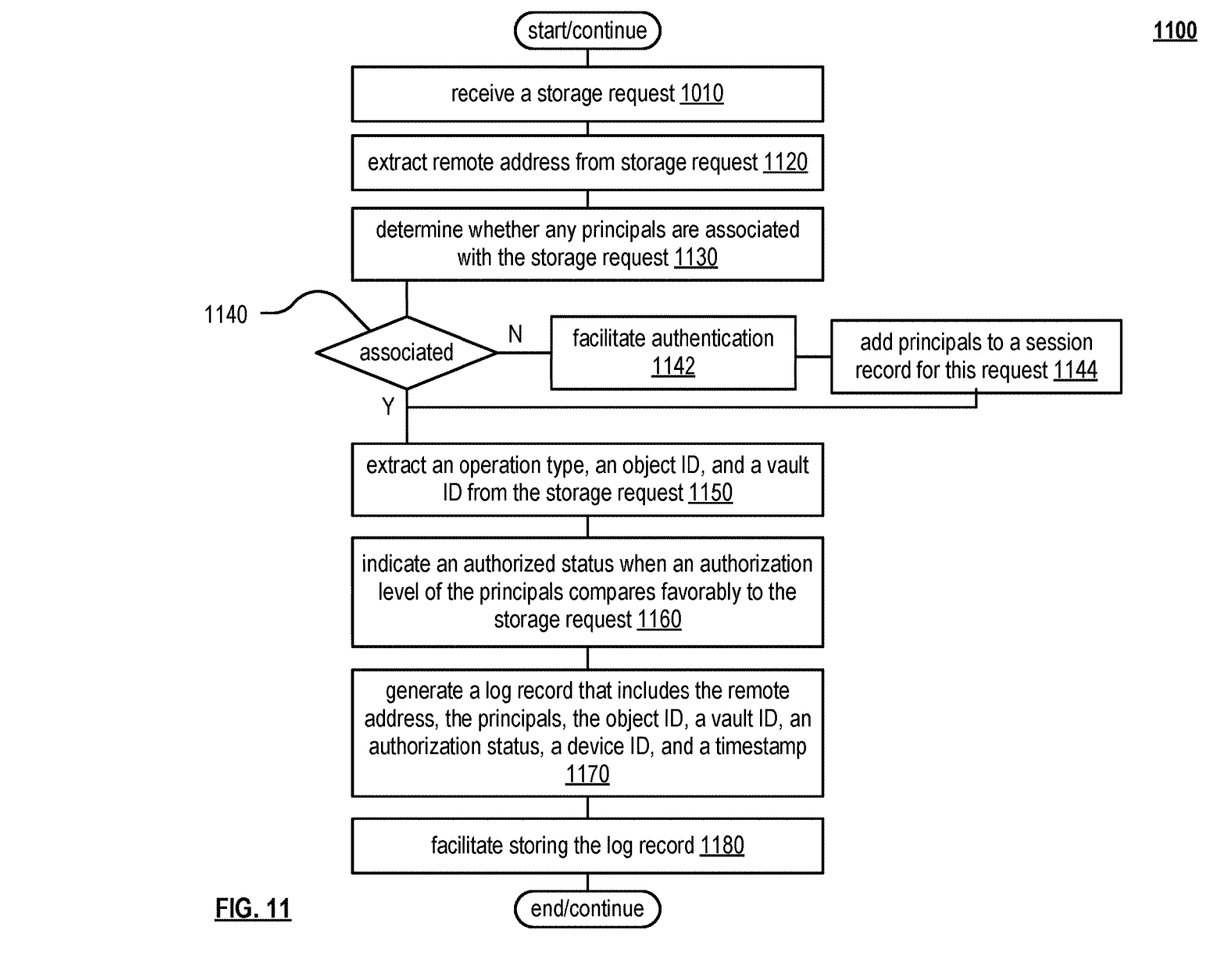
FIG. 11 is a flowchart illustrating an example of generating a storage request log record in accordance with the present invention.

FIG. 11 is a flowchart illustrating an example of generating a storage request log record in accordance with the present invention. The method 1100 begins with a step 1010 where a processing module (e.g., a computing device, a processor of a computing device, processing circuitry of a computing device, one or more computing devices, processors of one or more computing devices, and/or one or more processing circuitries of a computing device) receives a storage request. The storage request includes a dispersed or distributed storage network (DSN) access request including one of a write request, a read request, a delete request, and a login request. The method 1100 continues at the next step 1120 where the processing module extracts a remote address from the storage request. The remote address is associated with the sending entity of the storage request. The remote address may be extracted from the storage request by interpreting a media access control (MAC) address when ethernet transport is utilized and extracting an internet protocol address when an internet protocol is utilized.

The method 1100 continues at the step 1130 where the processing module determines whether any principals are associated with the storage request. The determination may be based on extracting one or more principal identifiers (IDs) from the storage request. The method 1100 branches via step 1140 to the step 1150 where the processing module extracts an operation type when the processing module determines that principals are associated with the storage request. The method 1100 continues via the step 1140 to the next step 1142 when the processing module determines that principals are not associated with the storage request. The method 1100 continues at the step 1142 where the processing module facilitates authentication. The facilitation includes at least one of verifying a user name and/or a password of the storage request and initiating a transport layer security (TLS) handshake. The method 1100 continues at the step 1144 where the processing module adds the principals to a session record for this request.

The method 1100 continues at the step 1150 where the processing module extracts an operation type, an object ID, and a vault ID from the storage request. The method 1100 continues at the step 1160 where the processing module generates an authorization status that indicates an authorized status when an authorization level of the principals compares favorably to a required authorization level of the storage request. The processing module may receive an access control list (ACL) from another computing device (e.g., a DS managing unit 18 such as with respect to FIG. 1) and extract authorization levels associated with the principals from the ACL. The processing module generates the authorization status to indicate an un-authorized status when the authorization level the principals compares unfavorably to the required authorization level of the storage request.

The method 1100 continues at the step 1170 where the processing module generates a log record that includes one or more of the remote address, the principals, the object ID, the vault ID, the authorization status, a device ID, and a timestamp. The method 1100 continues at the step 1180 where the processing module facilitates storing the log record. The facilitation includes at least one of generating an audit record, generating an audit object, storing the audit record, and/or sending the audit record to another computing device that is configured to store the audit record in a DSN memory.

Variants of the method 1100 include one or more method for execution by one or more computing devices in accordance with the present invention. For example, a variant of the method 1100 operates by receiving (e.g., via an interface of the computing device that is configured to interface and communicate with a dispersed or distributed storage network (DSN) and from a first other computing device) a storage request that is based on data object. Note that the data object is segmented into a plurality of data segments, and a data segment of the plurality of data segments is dispersed error encoded in accordance with dispersed error encoding parameters to produce a set of encoded data slices (EDSs) that is distributedly stored among a plurality of storage units (SUs) within the DSN. The variant of the method 1100 also operates by extracting a remote address from the storage request. Note that the remote address is associated with the first other computing device. The variant of the method 1100 continues by processing the storage request to determine whether any principals are associated with the storage request. Note that the principals include DSN system entities.

Then, based on a determination that the principals are associated with the storage request, the variant of the method 1100 continues by extracting an operation type, an object identifier (ID), and a vault ID from the storage request. The variant of the method 1100 then operates by generating an authorization status that indicates an authorized status based on a favorable comparison of authorization levels of the principals and a required authorization level of the storage request. The variant of the method 1100 continues by generating a log record that includes at least one of the remote address, the principals, the object ID, the vault ID, the authorization status, a device ID, and/or a timestamp. The variant of the method 1100 continues by facilitating (e.g., via the interface and via the DSN) storage of the log record within at least one of the first other computing device and/or a second other computing device.

Within some variants of the method 1100, the storage request includes at least one of a write request, a read request, a delete request, and/or a login request. Certain alternative variants of the method 1100 continue by processing the storage request in accordance with interpreting a media access controller (MAC) address or an Internet Protocol (IP) address of the storage request to extract the remote address from the storage request.

Alternative variants of the method 1100 continue by processing the storage request to determine whether any principals are associated with the storage request in accordance with extracting one or more principal identifiers (IDs) from the storage request.

Based on another determination that the principals are not associated with the storage request, even other alternative variants of the method 1100 continue by facilitating authentication of another principal in accordance with at least one of verifying a user name of the storage request and/or a password of the storage request and in accordance with initiating a Transport Layer Security (TLS) handshake with the other principal and add the other principal to a session record of the storage request.

Some other variants of the method 1100 continue by receiving (e.g., via the interface and via the DSN and from at least one other computing device) an access control list (ACL). Such variants of the method 1100 continue by extracting the authorization levels of the principals from the ACL.

Also, yet other variants of the method 1100 continue by facilitating (e.g., via the interface and via the DSN) the storage of the log record within the at least one of the first other computing device and/or the second other computing device in accordance with at least one of generating an audit record, generating an audit object, storing the audit record, and/or sending the audit record to the at least one of the first other computing device and/or the second other computing device to store the audit record in a DSN memory.

This disclosure presents, among other things, various novel solutions that provide for means by which generation and secure storing of a history of file/object accesses/operations on a per-user level may be made. For example, in a dispersed storage network, storage units (SUs) may have no understanding of how the data they store fits into the overall organized structure of the file system. Instead, they only see the one or more encoded data slices (EDSs) that they store. In other words, such SUs may see slices, but they will not see files, directories, meta-data, objects or segments. Therefore, in order to create meaningful audit trails, this disclosure presents, among other things, various novel solutions by which they may be produced at a location that is trusted and where this higher-level view of the data exists. One location within the DSN which fits these properties is within an accessor appliance (e.g., a computing device within the dispersed or distributed storage network (DSN) that is configured to perform data access operations with respect to one or more SUs). This disclosure teaches and discloses novel approaches for generating and securely storing a history of file/object accesses/operations on a per-user level.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computing device comprising:
   an interface configured to interface and communicate with a dispersed or distributed storage network (DSN);
   memory that stores operational instructions; and
   processing circuitry operably coupled to the interface and to the memory, wherein the processing circuitry is configured to execute the operational instructions to:
   receive, via the interface and from another computing device, a storage request that is based on a set of encoded data slices (EDSs) that is generated based on dispersed error encoding of a data segment associated with a data object in accordance with dispersed error encoding parameters, wherein the set of EDSs is distributedly stored among a plurality of storage units (SUs) within the DSN;
   process the storage request to determine whether any principals are associated with the storage request, wherein the principals include DSN system entities;
   based on a determination that no principals are associated with the storage request, facilitate authentication of one or more principals based on one or more characteristics of the storage request;
   add the one or more principals that have been authenticated to a session record of the storage request;
   generate a log record that is based on the storage request and the session record; and
   facilitate, via the interface, storage of the log record within at least one of the computing device, the another computing device, or a SU of the plurality of SUs of the DSN.

2. The computing device of claim 1, wherein the processing circuitry is further configured to execute the operational instructions, based on a determination that the principals are associated with the storage request, to:
   extract an operation type, an object identifier (ID), and a vault ID from the storage request;
   generate an authorization status that indicates an authorized status based on a favorable comparison of authorization levels of the principals and a required authorization level of the storage request; and
   generate the log record that includes at least one of a remote address that is associated with the another computing device, the principals, the object ID, the vault ID, the authorization status, a device ID, or a timestamp.

3. The computing device of claim 1, wherein the processing circuitry is further configured to execute the operational instructions to:
   facilitate authentication of another principal of the one or more principals based on the one or more characteristics of the storage request in accordance with at least one of verifying a user name of the storage request or a password of the storage request and also in accordance with initiating a Transport Layer Security (TLS) handshake with the another principal and add the another principal to the session record of the storage request.

4. The computing device of claim 1, wherein the storage request includes at least one of a write request, a read request, a delete request, or a login request.

5. The computing device of claim 1, wherein the processing circuitry is further configured to execute the operational instructions to:
   process the storage request in accordance with interpreting a media access controller (MAC) address or an Internet Protocol (IP) address of the storage request to extract a remote address that is associated with the another computing device from the storage request.

6. The computing device of claim 1, wherein the processing circuitry is further configured to execute the operational instructions to:
   facilitate, via the interface, the storage of the log record within the at least one of the computing device, the another computing device, or the SU of the plurality of SUs of the DSN in accordance with at least one of generating an audit record, generating an audit object, storing the audit record, or sending the audit record to the at least one of the computing device, the another computing device, or the SU of the plurality of SUs of the DSN to store the audit record in a DSN memory.

7. The computing device of claim 1, wherein:
a decode threshold number of EDSs are needed to recover the data segment;
a read threshold number of EDSs provides for reconstruction of the data segment;
a write threshold number of EDSs provides for a successful transfer of the set of EDSs from a first at least one location in the DSN to a second at least one location in the DSN;
the set of EDSs is of pillar width and includes a pillar number of EDSs;
each of the decode threshold number, the read threshold number, and the write threshold number is less than the pillar number; and
the write threshold number is greater than or equal to the read threshold number that is greater than or equal to the decode threshold number.

8. The computing device of claim 1, wherein the SU of the plurality of SUs is located at a first premises that is remotely located from a second premises of at least one other SU of the DSN of the plurality of SUs of the DSN.

9. The computing device of claim 1, wherein the computing device includes a SU of the plurality of SUs of the DSN, a wireless smart phone, a laptop, a tablet, a personal computers (PC), a work station, or a video game device.

10. The computing device of claim 1, wherein the DSN includes at least one of a wireless communication system, a wire lined communication system, a non-public intranet system, a public internet system, a local area network (LAN), or a wide area network (WAN).

11. A method for execution by a computing device, the method comprising:
receiving, via an interface of the computing device that is configured to interface and communicate with a dispersed or distributed storage network (DSN) and from another computing device within the DSN, a storage request that is based on a set of encoded data slices (EDSs) that is generated based on dispersed error encoding of a data segment associated with a data object in accordance with dispersed error encoding parameters, wherein the set of EDSs is distributedly stored among a plurality of storage units (SUs) within the DSN;
processing the storage request to determine whether any principals are associated with the storage request, wherein the principals include DSN system entities;
based on a determination that no principals are associated with the storage request, facilitating authentication of one or more principals based on one or more characteristics of the storage request;
adding the one or more principals that have been authenticated to a session record of the storage request;
generating a log record that is based on the storage request and the session record; and
facilitating, via the interface, storage of the log record within at least one of the computing device, the another computing device, or a SU of the plurality of SUs of the DSN.

12. The method of claim 11 further comprising:
extract an operation type, an object identifier (ID), and a vault ID from the storage request;
generate an authorization status that indicates an authorized status based on a favorable comparison of authorization levels of the principals and a required authorization level of the storage request; and
generate the log record that includes at least one of a remote address that is associated with the another computing device, the principals, the object ID, the vault ID, the authorization status, a device ID, or a timestamp.

13. The method of claim 11 further comprising:
facilitating authentication of another principal of the one or more principals based on the one or more characteristics of the storage request in accordance with at least one of verifying a user name of the storage request or a password of the storage request and also in accordance with initiating a Transport Layer Security (TLS) handshake with the another principal and add the another principal to the session record of the storage request.

14. The method of claim 11, wherein the storage request includes at least one of a write request, a read request, a delete request, or a login request.

15. The method of claim 11 further comprising:
processing the storage request in accordance with interpreting a media access controller (MAC) address or an Internet Protocol (IP) address of the storage request to extract a remote address that is associated with the another computing device from the storage request.

16. The method of claim 11 further comprising:
facilitating, via the interface, the storage of the log record within the at least one of the computing device, the another computing device, or the SU of the plurality of SUs of the DSN in accordance with at least one of generating an audit record, generating an audit object, storing the audit record, or sending the audit record to the at least one of the computing device, the another computing device, or the SU of the plurality of SUs of the DSN to store the audit record in a DSN memory.

17. The method of claim 11, wherein:
a decode threshold number of EDSs are needed to recover the data segment;
a read threshold number of EDSs provides for reconstruction of the data segment;
a write threshold number of EDSs provides for a successful transfer of the set of EDSs from a first at least one location in the DSN to a second at least one location in the DSN;
the set of EDSs is of pillar width and includes a pillar number of EDSs;
each of the decode threshold number, the read threshold number, and the write threshold number is less than the pillar number; and
the write threshold number is greater than or equal to the read threshold number that is greater than or equal to the decode threshold number.

18. The method of claim 11, wherein, wherein the SU of the plurality of SUs is located at a first premises that is remotely located from a second premises of at least one other SU of the DSN of the plurality of SUs of the DSN.

19. The method of claim 11, wherein, wherein the computing device includes a SU of the plurality of SUs of the DSN, a wireless smart phone, a laptop, a tablet, a personal computers (PC), a work station, or a video game device.

20. The method of claim 11, wherein, wherein the DSN includes at least one of a wireless communication system, a wire lined communication system, a non-public intranet system, a public internet system, a local area network (LAN), or a wide area network (WAN).

\* \* \* \* \*